United States Patent [19]

Haager

[11] Patent Number: 5,512,356
[45] Date of Patent: Apr. 30, 1996

[54] MULTILAYERED TEXTILE WEB FOR FORMING FLEXIBLE CONTAINERS, TENTS, AWNINGS, AND PROTECTIVE SUITS COMPRISING A RUBBER/POLYVINYLIDENE FLUORIDE FILM/RUBBER LAYER

[75] Inventor: Volker Haager, Vienna, Austria

[73] Assignee: Phoenix Aktiengesellschaft, Hamburg, Germany

[21] Appl. No.: 436,257

[22] Filed: May 15, 1995

[30] Foreign Application Priority Data

Nov. 16, 1992 [AT] Austria ................................ 2251/92

[51] Int. Cl.⁶ .................... B32B 7/00; B32B 27/00; F41H 1/02
[52] U.S. Cl. ................ 428/250; 2/2; 2/2.5; 428/246; 428/263; 428/286; 428/421
[58] Field of Search .................... 428/250, 245, 428/246, 263, 286, 421; 2/2, 2.5

[56] References Cited

U.S. PATENT DOCUMENTS

| | | | |
|---|---|---|---|
| 3,779,854 | 12/1973 | Dukert et al. | 161/156 |
| 3,922,186 | 11/1975 | Segawa et al. | 156/310 |
| 4,943,475 | 7/1990 | Baker et al. | 428/246 |
| 5,264,276 | 11/1993 | McGregor et al. | 428/252 |

*Primary Examiner*—James D. Withers
*Attorney, Agent, or Firm*—Herbert Dubno

[57] ABSTRACT

In a multilayered textile web for forming flexible containers, tents, awnings, protective suits and the like, with a textile layer (5), a rubber layer (6) located on one side of the textile layer (5), and with a plastics film (7) located on the other side of the textile layer (5), said plastics film being located between two rubber layers (6) and comprises polyvinylidene fluoride.

1 Claim, 1 Drawing Sheet

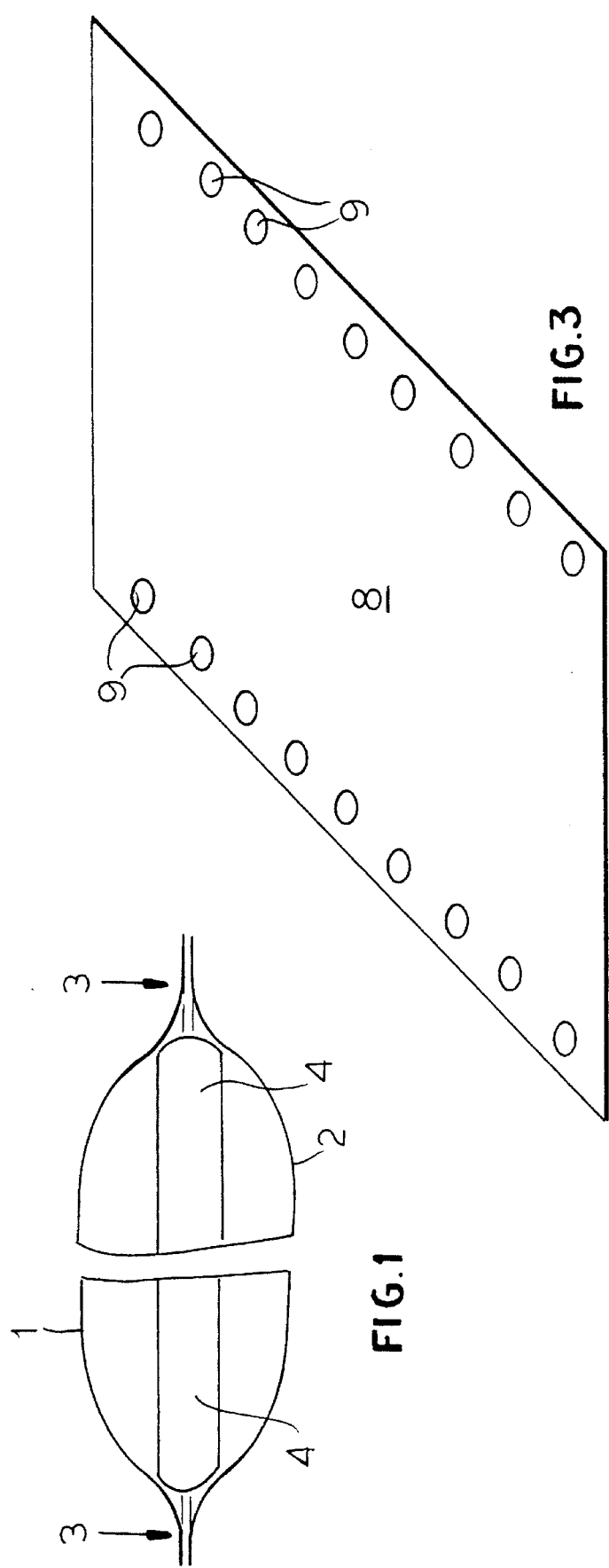

MULTILAYERED TEXTILE WEB FOR FORMING FLEXIBLE CONTAINERS, TENTS, AWNINGS, AND PROTECTIVE SUITS COMPRISING A RUBBER/POLYVINYLIDENE FLUORIDE FILM/RUBBER LAYER

The invention relates to a multilayered textile web for forming flexible containers, tents, awnings, protective suits and the like, with a textile layer, a rubber layer placed on one side of the textile layer, and a plastics film placed on the other side of the textile layer, said plastics film being located between two rubber layers.

A textile web of this type is known from DE-A1-39 07 453, in which a polyimide layer is used as a plastics film, and which is embedded between two layers of a fluorocaoutchouc mixture. As fluorocaoutchouc, a mixture is used which is commercially available under the trade mark VITON®. The layer of VITON® is intended to protect the polyimide layer from ultraviolet radiation, to which this material does not have a high resistance.

The use of VITON® against the action of chemicals and gases is also known from EP-A1-0432 492 and WO 91/03379.

The purpose of the present invention is to provide a multilayered textile web which is suitable for forming flexible containers, tents, awnings, protective suits and the like, which offers protection against chemical weapons and also other chemicals, and which has better properties than the known materials. This purpose is fulfilled by the fact that the plastics film is made of polyvinylidene fluoride.

As numerous tests have shown, a textile web according to the invention is extraordinarily resistant, not only in the mechanical sense but also against practically all chemical weapons and chemicals. In comparison to a layer made of VITON®, the polyvinylidene fluoride layer used according to the invention is more effective by a multiple, particularly when used in atomic/biological/chemical operations, as the following table shows:

| Material | Weight/m$^2$ | ABC Use Duration |
| --- | --- | --- |
| VITON ®/butyl | 500 g | 18 h |
| Butyl/butyl/polyvinylidene fluoride | 380 g | >500 h |
| Butyl/butyl/polyvinylidene fluoride | 500 g | >500 h |
| Butyl/butyl/polyvinylidene fluoride | 650 g | >500 h |
| Butyl/butyl/polyvinylidene fluoride | 1000 g | >500 h |
| Hypalon/polyvinylidene fluoride/neoprene | 500 g | >500 h |
| Butyl/butyl | 1000 g | 14 h |

As is apparent, the use of a layer of VITON® compared to use of a butyl layer does entail an improvement; the difference upon use of a layer of polyvinylidene fluoride, however, is substantial.

By means of the rubber layers located on both sides of the layer of polyvinylidene fluoride, surprisingly, the suppleness of the textile web is also increased, and thus its handling simplified.

When a rubber layer is disposed on the outer side of the layer of polyvinylidene fluoride, not only is protection of the layer of polyvinylidene fluoride achieved, this protection being particularly important in the action of chemical weapons, but the additional rubber layer also acts as an indicator, because damage to the rubber layer is much easier to detect than damage to the layer of polyvinylidene fluoride; if the rubber is damaged, tests can be carried out to ascertain whether the layer of polyvinylidene fluoride has also undergone a detrimental effect, and whether the awning, protective suit or the like must be replaced.

The invention will be described in more detail in the following with reference to embodiments given by way of example and shown in the drawing, without however being restricted to these examples. Shown are:

FIG. 1: a cross-section through a flexible liquid container;

FIG. 2: the structure of the textile web used for the container according to FIG. 1, and FIG. 3: a pictorial view of an awning, e.g. for covering military equipment.

According to FIG. 1, a flexible liquid container or tank comprises two multilayered textile webs 1 and 2, connected together at the edges. Reinforcing strips 4 are attached in order to reinforce the lateral connections. The container is provided in a way known per se with openings (not shown) which permit the liquid to be introduced or drawn off, and also permit air evacuation.

As can be seen from FIG. 2, the multilayered textile webs 1 and 2 comprise a textile layer 5, upon both sides of which a rubber layer 6 is attached. The upper rubber layer 6 in the drawing is covered by a layer 7 of polyvinylidene fluoride, over which a further rubber layer 6 is placed. The layer 7 of polyvinylidene fluoride located between the two rubber layers 6, in the case of containers for transporting contaminated material, lies on the inner side. For other applications this layer 7, enclosed by two rubber layers 6, will lie on the outer side of the textile layer.

As already stated, the layer 1 of polyvinylidene fluoride is in the form of a film. The rubber layer is applied in a rubberising process known per se, and the individual layers are interconnected by vulcanising. In this respect a temperature of approximately 140° to 175° C. and a pressure of the order of 3 bar may be applied for a period of approximately 20 minutes.

FIG. 3 shows pictorially an awning such as may be used as a cover, particularly for military equipment. A multilayered textile web 8 is provided at the sides with eyelets 9 so that the awning may be secured. The textile web 8 has the same basic structure as the textile webs 1 and 2.

Numerous variations are possible within the scope of the invention. Thus the multilayered textile web according to the invention may for example also be used to form containers in which contaminated soil or the like is taken to a testing site. Tents, ABC warfare locks, protective suits and more of the like may be manufactured from multilayered textile webs according to the invention. Depending upon the type of stress to which they are subjected, the weight per square meter will fluctuate, approximately within a range between 350 g/m$^2$ and 1500 g/m$^2$.

I claim:

1. A multilayered textile web for forming flexible containers, tents, awnings and protective suits, comprising a textile layer, a rubber layer located on one side of the textile layer, and a plastic film located on the other side of the textile layer, said plastic film being sandwiched between two rubber layers, wherein the plastic film comprises polyvinylidene fluoride.

* * * * *